Sept. 29, 1953

R. B. DOME 2,654,033

SYNCHRONIZING CIRCUIT

Filed Dec. 24, 1948

Inventor:
Robert B. Dome,
by Merton D. Morse
His Attorney.

Patented Sept. 29, 1953

2,654,033

UNITED STATES PATENT OFFICE 2,654,033

SYNCHRONIZING CIRCUIT

Robert B. Dome, Onondaga, N. Y., assignor to General Electric Company, a corporation of New York Application December 24, 1948, Serial No. 67,142

8 Claims. (Cl. 250—36)

Figure 1:
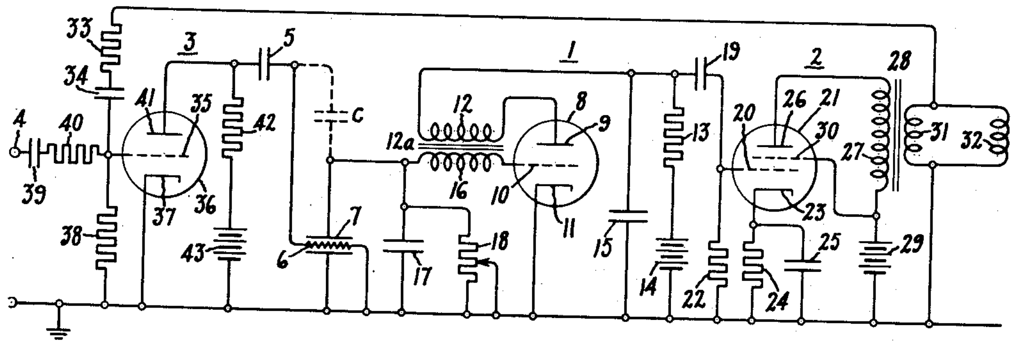

My invention relates to synchronizing systems and, particularly, to synchronizing systems which employ a periodic synchronizing signal which may be contaminated by spurious and undesired signals. While my invention is of general utility, it is of particular utility in the field of television wherein it is desirable to provide noise-free synchronization of the scanning oscillators, especially the line frequency scanning oscillator, of the television receiver.

It is an object of my invention to provide means for synchronizing an oscillator from a periodic synchronizing signal wherein the controlled oscillator is substantially unaffected by the presence of spurious noise pulses and random interference in the periodic synchronizing signal.

For some purposes, it is necessary to synchronize an oscillator from a periodically occurring pulse of small energy content relative to a sine wave of the same amplitude and frequency. This requirement is found in television systems wherein the composite synchronizing signal is transmitted as a series of pulses which occur during the line and field retrace intervals, these pulses being separated from the picture signal at the television receiver and utilized to synchronize the scanning oscillators at the receiver with the scanning oscillators at the transmitter. Certain synchronizing systems heretofore proposed for synchronizing the scanning oscillators at the receiver have applied the synchronizing signals directly to the scanning oscillators. Such systems provide relatively little discrimination against spurious pulses which may be interspersed with the synchronizing pulses and hence such systems are subject to periods of asynchronous operation. These directly synchronized oscillators will also fall out of synchronism immediately upon failure of synchronized pulses.

Various arrangements have been proposed to obtain an automatic frequency control or "AFC" type of synchronization in which the synchronizing pulses are modified to a greater or lesser extent before being applied to the scanning oscillator, in order to provide discrimination against random noise impulses. In these arrangements the synchronized pulses are combined with an output wave from the scanning oscillator, the wave shape of the resultant wave being a function of the relative phase relation of the synchronizing pulses and the output wave from the scanning oscillator. The resultant wave is integrated over a large number of cycles so that the effects of random noise pulses are averaged out and only gradual changes in the phase relationship of the two combined waves will appear in the output of the integration circuit. Certain of these arrangements, which are of the "direct current control" type, utilize the direct current component of the above-mentioned resultant wave for synchronization, the direct current component being selected by means of a rectifier circuit and integrated by means of an electrical circuit having a relatively long time constant. These "direct current control" systems usually require separate rectifiers and auxiliary amplifiers to obtain a unidirectional control voltage of sufficient amplitude to control the scanning oscillator.

Other arrangements, recognizing that the alternating current components of the above-mentioned resultant wave are also dependent upon the phase relationship of the two combined waves, utilize the alternating current components of the resultant wave to effect synchronization of the scanning oscillators. In these other arrangements, which employ an "alternating current control" type of synchronization, the alternating current components of the resultant wave are selected and are integrated over a substantial number of cycles by storage in a resonant circuit which is tuned to the fundamental frequency of the alternating current components. Such an "alternating current control" system, for example, is described and claimed in copending application Serial No. 87,862 of Wolf J. Gruen, filed on April 16, 1949, now Patent 2,598,370, granted May 27, 1952, and assigned to the assignee of the present invention. While the "alternating current control" system is advantageous from the standpoint of simplicity, since the tank circuit of the scanning oscillator may itself be utilized to integrate the alternating current components, it is desirable to increase the synchronizing range of such a system without sacrificing the noise-free qualities obtained thereby.

It is an object of my invention therefore to provide a new and improved oscillator synchronizing system which effects certain improvements over the prior art systems of this nature.

It is another object of my invention to provide a new and improved means for synchronizing an oscillator from a periodic synchronizing signal which may be contaminated by spurious and undesired signals.

It is still another object of my invention to provide a new and improved means for synchronizing an oscillator from a periodic synchronizing signal which may be contaminated by spurious and undesired signals, in which synchronization is effected by means of thermal integration of the periodic synchronizing signal.

It is a further object of my invention to provide a new and improved means for synchronizing an oscillator from a periodic synchronizing signal which may be contaminated by spurious and undesired signals, in which synchronization is effected by means of thermal integration of the alternating current components of a waveform derived from the periodic synchronizing signal.

It is a still further object of my invention to provide a new and improved means for synchronizating an oscillator from a periodic synchronizing signal which may be contaminated by spurious and undesired signals, in which alternating current energy which is representative of the phase relationship of the periodic synchronizing signal and the oscillator, is stored in the form of heat energy in a heat dissipative body, the average value of such stored heat energy being utilized to control the frequency of the oscillator.

In accordance with the invention, in my synchronized oscillator system a synchronizing signal consisting of periodically recurring pulses of relatively short time duration compared to the recurrence interval thereof and subject to spurious pulses of a similar nature is combined with the output wave of an oscillation generator having a free-running frequency substantially the same as said synchronizing signal combining to obtain a periodic wave dependent in waveform upon the phase relation of said oscillation generator and said synchronizing signal. Electrical energy of said periodic wave is stored in the form of heat energy and the stored heat energy is utilized to control the frequency of the oscillation generator.

In a particular embodiment of my invention the alternating current components of the periodic wave are selected and are made to flow through a resistive body. The flow of current through this resistive body generates heat, the magnitude of which varies in accordance with changes in the phase relation of the synchronizing signal and the oscillation generator. The heat generated in the resistive body is utilized to control the frequency of the oscillator. In one form of the invention the heat generating resistive body is located contiguous to a frequency determining capacitive element of the oscillator, the capacitive element having a temperature coefficient of the proper polarity to maintain synchronism between the oscillation generator and the synchronizing signal.

Figure 2:
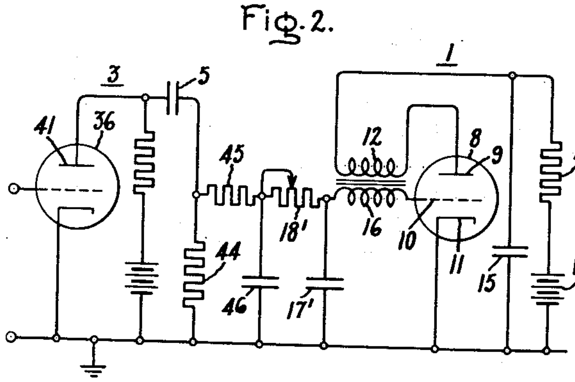
Figure 3:
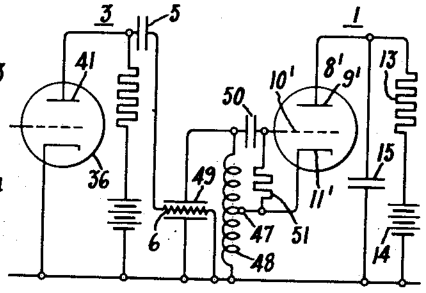

The novel features which are considered to be characteristic of my invention are set forth with particularity in the appended claims. My invention itself, however, both as to its organization and method of operation, together with further objects and advantages thereof, may best be understood by reference to the following description taken in connection with the accompanying drawings wherein Fig. 1 is a circuit diagram of a synchronized oscillator system embodying my invention; Fig. 2 is a circuit diagram of a synchronized oscillator system embodying my invention in modified form and Fig. 3 is a circuit diagram of a synchronized oscillator system embodying my invention in an additionally modified form.

Referring generally to Fig. 1, there is represented schematically a synchronized oscillator arrangement embodying my invention in a preferred form. An oscillation generator indicated generally at 1 is utilized to provide a saw tooth output wave which is amplified in a saw tooth waveform amplifier indicated generally at 2. Pulses which appear across the output circuit of amplifier 2 are connected to the control electrode of a mixing device indicated generally at 3, a source of synchronizing pulses also being coupled to the control electrode of device 3 through input terminal 4. A wave which is derived from a combination of the output wave of device 2 and the synchronizing pulses appears in the anode circuit of device 3 and the waveform of this derived wave is dependent upon the phase relation of the oscillator output wave and the synchronizing pulses. The direct current component of the derived wave is blocked by means of a capacitor 5 and the energy represented by the alternating current components of the derived wave is dissipated in the form of heat in a resistor 6. Resistor 6 is located contiguous to a frequency determining capacitor 7 of the oscillator 1 so that changes in the relative phase relation of the synchronizing pulses and the output wave of the oscillator produce a corresponding change in the alternating current energy being dissipated as heat by resistor 6. This change in heat energy changes the capacity of capacitor 7, this capacitor having the proper polarity of temperature coefficient to vary the frequency of the oscillator so that the oscillator is maintained in synchronism with the synchronizing pulses.

Referring now more particularly to Fig. 1, the oscillation generator 1 comprises an electron discharge device 8 having an anode 9, a control electrode 10 and a cathode 11. The anode 9 of device 8 is connected through winding 12 of a transformer 12*a* and a resistor 13 to a unidirectional source of potential indicated by the numeral 14. A capacitor 15 is connected from the junction point of inductance 12 and resistor 13 to ground. The cathode 11 of device 8 is connected to ground. The control electrode 10 of device 8 is connected through another winding 16 of transformer 12*a* to a parallel combination comprising capacitors 7 and 17 and variable resistor 18. Oscillations produced by device 8 are coupled through a capacitor 19 to the control electrode 20 of an electron discharge device 21. A leak resistor 22 connects control electrode 20 to ground and the cathode 23 of device 21 is connected to ground through a parallel combination of a resistor 24 and a capacitor 25. The anode 26 of device 21 is connected through the primary 27 of a sweep output transformer 28 to a unidirectional source of potential indicated by the numeral 29. The screen electrode 30 of device 21 is also connected to the unidirectional source of potential 29. The secondary 31 of transformer 28 is connected to the magnetic scanning coil which surrounds the neck of the cathode ray tube, indicated as the inductance 32. One side of the scanning coil 32 is connected to ground, the other side of this coil being connected through a limiting resistor 33 and a capacitor 34 to the control electrode 35 of an electron discharge device 36. The cathode 37 of device 36 is connected to ground. A leak resistor 38 connects control electrode 35 to ground. A synchronizing signal may be applied to control electrode 35 through a capacitor 39 and a limiting resistor 40. The anode 41 of device 36 is connected through a resistor 42 to a unidirectional source of potential indicated by the numeral 43. The anode 41 is also connected through a capacitor 5 to resistor 6 which as mentioned heretofore is located contiguous to capacitor 7. While there are obviously many ways in which resistor 6 may be placed in contiguity with the frequency determining capacitor 7, I have found it quite convenient to utilize a small tubular-shaped carbon resistor as resistor 6, and a hollow tubular ceramic capacitor as capacitor 7, the diameter of the resistor being small enough so that the resistor may fit into the central opening of the tubular capacitor. If desired, a small capacitor C indicated in dotted lines in the drawing may be connected between capacitor 5 and inductance 16 to provide some measure of direct synchronization as will be discussed in more detail hereinafter.

Considering now the operation of the oscillator synchronizing system just described, the means for generating oscillations is shown as a blocking oscillator of well known design. Briefly considering the operation of the blocking oscillator, the anode 9 and control electrode 10 of device 8 are coupled together by means of iron core feed-back transformer 12*a* so as to produce oscillations, the control electrode biasing network comprising resistor 18 and capacitors 7 and 17 being sufficiently large that oscillation ceases after a single cycle thereof and does not start until a lapse of an appreciable time interval. The blocking action of device 8 is accomplished by the flow of control electrode current through capacitors 7 and 17 during the positive portion of the single oscillation. This charges the capacitors to a potential considerably greater than the control electrode cutoff potential of device 8, and the device remains inactive for a period determined by the time required for capacitors 7 and 17 to discharge through resistor 18 until device 8 is again in a conductive stage, whereupon the cycle is repeated. Thus, the anode current of device 8 is in the form of a series of periodic pulses, the recurrence interval of these pulses being determined primarily by the capacitors 7 and 17 and resistor 18. The free running frequency of the oscillator may be conveniently adjusted by varying resistor 18. While I have indicated the frequency determining R. C. network of the blocking oscillator as being in series with the control electrode of device 8, it is obvious that this network may be utilized in the anode or cathode circuit of device 8 and will operate to control the frequency thereof in a similar manner.

To generate a saw tooth sweep voltage for scanning the cathode ray tube viewing screen, I provide a capacitor 15 which is charged from potential source 14 through a resistor 13. Pulses of anode current of device 8 operate periodically to discharge capacitor 15 whereby a saw tooth wave of voltage is produced thereacross. The saw tooth voltage wave produced across capacitor 15 is coupled to the control electrode of sweep amplifier 21 wherein it is amplified and is transformed in sweep output transformer 28 into a saw tooth wave of current which flows through electromagnetic scanning coil 32. During retrace intervals of the scanning wave there are produced across scanning coil 32 pulses of relatively large amplitude, these pulses being produced by virtue of the high rate of change of current through the inductance of the scanning coil during retrace intervals, as will be readily apparent to those skilled in the art.

In order to obtain an electrical wave which is dependent upon the phase relationship of oscillation generator 1 and an incoming synchronizing signal consisting of periodically recurring synchronizing pulses, I provide means for combining the oscillator derived output pulses which are produced across scanning coil 32 and the incoming synchronizing pulses. More particularly, the oscillator derived pulses and the synchronizing pulses are applied to the control electrode of a mixer device 36, wherein they are combined and amplified. In the anode circuit of device 36 there is derived a wave which is dependent in waveform upon the relative phase relation of the oscillator derived pulses and the synchronizing pulses. Specifically, in the illustrated embodiment, the oscillator derived pulses and the synchronizing pulses are of negative polarity and are of sufficiently large amplitude so that either set of pulses drives the mixer device 36 beyond the anode current cutoff point, so that variations in the amplitude of either group of pulses do not affect the waveform of the wave derived from the anode circuit of the mixer. There is thus produced in the anode circuit of mixer device 36 periodically recurring pulses which correspond to the oscillator derived pulses and the synchronizing pulses, these periodically recurring pulses being variable in width in accordance with variations in the phase relationship of the oscillator derived pulses and the synchronizing pulses.

To control the oscillation generator 1 in accordance with the phase responsive wave derived from the anode of mixer device 36, I provide means for supplying the alternating current components of said derived wave to a heat dissipative body which is located contiguous to a frequency determining element of the oscillation generator. More particularly, the alternating current components are passed by blocking capacitor 5 and are applied to a heat dissipative resistor 6 which is located contiguous to a frequency determining capacitive element 7 of oscillation generator 1. The flow of the alternating current components of the phase responsive derived wave through resistor 6 produces heat therein and the amount of heat dissipated in resistor 6 by such flow of current is dependent upon the waveform of the derived wave. The heat produced by resistor 6 changes the operating temperature of capacitor 7 due to the close proximity of the two elements and the change in temperature produces a certain change in the capacity of capacitor 7 depending upon the polarity and magnitude of the temperature coefficient of the capacitor. Therefore, if capacitor 7 is chosen with the proper polarity of temperature coefficient, changes in the heat dissipated by resistor 6 cause corresponding changes in the capacity of capacitor 7 in the proper direction so as to maintain synchronism between the oscillation generator 1 and the synchronizing pulses. For example, if the free running frequency of oscillation generator 1 is somewhat lower than the frequency of the synchronizing pulses, and the phase displacement due to this difference in frequency results in an increase in the alternating current components of the derived wave supplied to resistor 6, capacitor 7 would be chosen with a negative temperature coefficient so that the increased heat dissipated by resistor 6 would decrease the capacity of capacitor 7 and thus increase the frequency of oscillation generator 1. If the free running frequency of oscillation generator 1 were adjusted to a value higher than that of the synchronizing pulses an opposite effect would be required.

Inasmuch as the frequency of oscillation generator 1 is controlled by a change in temperature of one of the frequency determining elements of the oscillator, it is desirable to provide means for compensating the oscillator for changes in ambient temperature which are not due to the controlling heat energy. This change in ambient temperature may be due to dissipation of heat in other resistive elements of the oscillator or to other circuits of the receiver. To compensate for such changes in ambient temperature I provide a capacitor 17 which is also a frequency determining element of the oscillator, and the temperature coefficient of capacitor 17 is chosen with a polarity which is opposite to that of capacitor 7. The capacity of capacitor 17 thus compensates for changes in the ambient temperature of the oscillator so that the only change in the frequency of the oscillator is due to the heat generated by the phase responsive wave which flows through resistor 6. While I have indicated capacitor 17 as being in parallel with capacitor 7, it is obvious that the two capacitors could be placed in series and the same operation would be obtained. Also, in order to obtain the maximum simplicity of design, the temperature coefficient of variable resistor 18 may be utilized to compensate for changes in the ambient temperature of the oscillator, thus eliminating the necessity for the additional compensating capacitor 17.

To augment the control afforded by heat dissipative resistor 6, I also provide means for applying the synchronizing pulses directly to the oscillation generator. Such means comprises a capacitor C which is shown in Fig. 1 as connected between the capacitor 5 and capacitor 7. Capacitor C is preferably of a relatively small value so that synchronizing pulses which are applied to the oscillator through capacitor C do not completely control the oscillator but instead the main controlling effect is obtained by the change in heat dissipated by resistor 6.

It is an important feature of my invention that the heat energy produced in resistor 6 is stored therein over a substantial number of cycles. Due to the thermal inertia of resistor 6 there is produced an integrating effect which averages out any abrupt changes in the alternating current components which may be due to noise or other spurious and undesired pulses which are interspersed with the synchronizing pulses. There is thus obtained an essentially noise-free synchronizing system in which synchronizing pulses and oscillator derived pulses are combined to obtain a phase responsive derived wave. The alternating current components of the derived wave are transformed into heat energy and stored in a body having substantial thermal inertia, thereby obtaining an averaging effect over a substantial number of synchronizing pulses. It is to be noted that the heat dissipative body, specifically illustrated as resistor 6, has a heat time constant which is similar to the electrical time constant of the resistance-capacitance network which is utilized in conventional automatic frequency control systems to obtain integration of a phase responsive derived wave. This heat time constant may be thought of as the time required for a heated body to decrease in temperature to $1/\epsilon$ of its initial value with respect to the embient temperature in much the same way as the time constant of a resistance-capacitance network would be the time required for the voltage across the capacitor to decrease to $1/\epsilon$ of its initial value. A black body would thus have a relatively short heat time constant as compared to a white body. Resistor 6 may be chosen with a heat time constant comparable to the electrical time constant of the conventional automatic frequency control system in order to produce sufficient integration so that the synchronization is substantially unaffected by undesired noise pulses.

Fig. 2 is a circuit diagram of a modified form of my invention which is basically similar to the oscillator synchronizing system of Fig. 1, identical circuit elements being designated by the same reference numerals and analogous circuit elements by the same reference numerals primed.

In the modification of Fig. 2 a resistor 44 is connected between capacitor 5 and ground and a parallel combination of a resistor 45 and capacitor 46 is connected across resistor 44. In other particulars the circuits of Figs. 1 and 2 are essentially the same, it being understood that the remainder of the circuit not shown in Fig. 2 may be identical to that of Fig. 1.

Considering the operation of the modified form of my invention thus described, a temperature sensitive resistance is herein used as the frequency determining control element of the oscillator instead of the frequency determining capacitive element utilized in Fig. 1. Specifically, resistors 44 and 45 are chosen with the proper polarity of temperature coefficient so that changes in the heat generated therein due to a flow of the alternating current components of the phase responsive derived wave appearing at the anode of device 36, cause the frequency of the oscillator to vary in the proper direction so that synchronism is maintained. A large capacitor 46 is connected across resistors 44 and 45 to by-pass the alternating current voltage which appears across these resistors so that a very small portion of the synchronizing pulses is applied directly to the oscillator. It will be apparent that the incomplete by-passing action of capacitor 46 operates in a manner similar to the coupling capacitor C of Fig. 1 to provide a small amount of direct synchronization. Resistor 18′ may be varied to adjust the free running frequency of oscillation generator 1, the synchronizing control means being effected through heat responsive resistors 44 and 45. It is to be noted that the frequency of oscillation generator 1 may be controlled by the bias voltage to which its control electrode 10 may be returned in any well known manner. Resistors 18′, 44 and 45 all carry the direct current component of the control electrode current of the oscillator. The bias voltage for the control electrode 10 is thus dependent upon the resistance included in the control electrode circuit, the resistance of resistors 44 and 45 in turn being controlled by the heat applied thereto. Thus, the bias voltage for the control electrode 10 and correspondingly the frequency of oscillator 1 is controlled by the heat applied to resistors 44 and 45. It will be understood that pulses which are derived from oscillation generator 1 and the synchronizing pulses are applied to the control electrode of device 36 in a manner similar to that shown in Fig. 1.

Fig. 3 is a circuit diagram of an alternative embodiment of my invention which is essentially similar to the synchronizing system of Fig. 1, identical circuit elements being designated by the same reference numerals and analogous reference elements by the same reference numerals primed, except that the means for generating oscillations comprises in the present arrangement a sine wave oscillator. This oscillator, which may be of any well known type, is shown as a cathode tap Hartley oscillator in which the cathode 11′ of electrode discharge device 8′ is connected to a tap 47 on inductance 48. A capacitor 49 is connected in parallel with inductance 48 to form a parallel resonant tank circuit which is resonant at the desired oscillation frequency. A biasing network comprising capacitor 50 and resistor 51 is connected to the control electrode of device 8′.

In considering the operation of the embodiment of my invention shown in Fig. 3, a phase responsive derived wave is produced at the anode 41 of device 36. The alternating current components of this derived waveform are coupled through capacitor 5 to a heat generating resistor 6. The heat generator resistor 6 is located contiguous to the frequency determining capacitor 49 of the Hartley oscillator. Thus, changes in the heat generated by resistor 6 produces corresponding changes in the capacity of capacitor 49. This capacitor is chosen with a temperature coefficient of the proper polarity to maintain synchronism between the incoming synchronizing pulses and the oscillation generator. It will be understood that pulses of anode current of device 8' operate periodically to discharge capacitor 15 whereby a saw tooth wave of voltage is produced across capacitor 51 in a manner similar to that of the blocking oscillator of Fig. 1. While I have indicated the sine wave oscillator as being of the Hartley type, it will be readily apparent to those skilled in the art that other types of sine wave oscillators may be utilized without distinguishing from my invention. It is also possible to control the inductance element of the sine wave oscillator by means of the heat control resistor 6.

From the above description of the invention it will be evident that an oscillation synchronizing system embodying my invention has the advantage that synchronization is obtained from the alternating current components of a phase responsive derived waveform, these components being integrated over a substantial number of cycles by virtue of the heat time constant of a heat dissipative body. It is thus possible to utilize a synchronizing signal which is interspersed with spurious and undesired pulses of substantial amplitude and still obtain essentially noise-free synchronization of the oscillator. Further, since the integration may be effected thermally in a conventionally sized resistor the circuit becomes considerably simpler than that of automatic frequency control systems in which a unidirectional control voltage is obtained by the use of auxiliary rectifiers and amplifiers.

While the invention has been described by particular embodiments thereof, it will be understood that numerous modifications may be made by those skilled in the art without departing from the invention. I therefore aim in the appended claims to cover all such equivalent variations as come within the true spirit and scope of my invention.

What I claim as new and desire to secure by Letters Patent of the United States is:

1. In a television receiver adapted to receive synchronizing signals consisting of periodically recurring pulses of short time duration compared to the recurrence interval thereof and subject to spurious pulses of a similar nature, an oscillator synchronizing system comprising an oscillation generator for generating a periodic output wave of approximately the same average frequency as said synchronizing signals in the absence of frequency-corrective energy applied thereto, said oscillation generator including a temperature-responsive frequency-determining element, means for substantially eliminating the deleterious effect of said spurious pulses comprising, means for comparing said output wave with said synchronizing signals and deriving therefrom a periodic wave dependent in waveform upon the phase difference between said synchronizing signals and said output wave, means for producing changes in the temperature of said frequency-determining element as a function of changes in the waveform of said derived wave, said temperature changes being in a sense to vary the instantaneous frequency of said oscillation generator in the proper direction substantially to maintain the output wave of said generator in phase with said synchronizing signals.

2. In a television receiver adapted to receive synchronizing signals consisting of periodically recurring pulses of short time duration compared to the recurrence interval thereof and subject to spurious noise voltages of a similar nature, an oscillator synchronizing system comprising an oscillator having a free running frequency substantially equal to the frequency of said synchronizing signals, said oscillator having a temperature-responsive frequency-determining element associated therewith, a heat dissipative element adjacent said frequency determining element, means for obtaining output pulses from said oscillator which are of relatively short time duration compared to the recurrence interval thereof, means for combining said synchronizing signals and said output pulses to obtain derived pulses of relatively fixed amplitude, the width of said derived pulses being dependent upon the relative phase relation of said synchronizing pulses and said output pulses, means for selecting the alternating current components of said derived pulses, means for supplying said alternating current components to said heat dissipative element so that said frequency-determining element varies in the proper direction substantially to maintain said output pulses in phase with said synchronizing signals.

3. In a television receiver adapted to receive synchronizing signals consisting of periodically recurring pulses of short time duration compared to the recurrence interval thereof and subject to spurious noise voltages of a similar nature, an oscillator synchronizing system comprising an oscillator having a free running frequency substantially equal to the frequency of said synchronizing signals, said oscillator having first and second temperature-responsive frequency determining elements associated therewith, a heat dissipative element in contiguity with said first frequency determining element, means for obtaining output pulses from said oscillator which are of relatively short time duration compared to the recurrence interval thereof, means for combining said synchronizing signals and said output pulses to obtain derived pulses of relatively fixed amplitude, the width of said derived pulses being dependent upon the relative phase relation of said synchronizing pulses and said output pulses, means for selecting the alternating current components of said derived pulses, means for supplying said alternating current components to said heat dissipative element, said first frequency-determining element having a temperature coefficient of such polarity that changes in the temperature of said heat dissipative element cause changes in the frequency of said oscillator in the proper direction substantially to maintain said oscillator in phase with said synchronizing signals, said second frequency determining element having a temperature coefficient of a polarity opposite to said first frequency determining element whereby changes in ambient temperature have substantially no effect upon the frequency of said oscillator.

4. In an oscillator synchronizing system, the combination of a source of synchronizing signals which may be contaminated by spurious and undesired impulses, an oscillation generator having a temperature-sensitive frequency determining capacitive element and arranged to provide an output wave of substantially the same frequency as said synchronizing signals in the absence of frequency-corrective energy applied thereto, a resistor in contiguity with said frequency determining capacitive element, means for substantially eliminating the deleterious effect of said spurious and undesired impulses while maintaining synchronism between said synchronizing signals and said output wave comprising, means for deriving a periodic wave dependent in waveform upon the relative phase relation of said synchronizing signals and said output wave, means for selecting the alternating current components of said periodic wave, and means for applying said selected alternating current components to said resistor, said capacitive element having a temperature coefficient of capacity of such polarity that changes in the temperature of said resistor cause changes in the frequency of said oscillation generator in the proper direction substantially to maintain said output wave in phase with said synchronizing signals.

5. In an oscillator synchronizing system, the combination of a source of synchronizing signals which may be contaminated by spurious and undesired impulses, an oscillation generator having a temperature-sensitive frequency determining element and arranged to provide an output wave of substantially the same frequency as said synchronizing signals in the absence of frequency-corrective energy applied thereto, a resistor in heat-transmitting relation to said frequency determining element, means for substantially eliminating the deleterious effect of said spurious and undesired pulses while maintaining synchronism between said synchronizing signals and said output wave comprising, means for deriving a periodic wave dependent in waveform upon the relative phase relation of said synchronizing signals and said output wave, and means for applying only the alternating current components of said derived wave to said resistor, said frequency determining element having a temperature coefficient of such polarity that changes in the temperature of said resistor cause changes in the frequency of said oscillation generator in the proper direction substantially to maintain said output wave in phase with said synchronizing signals.

6. In an oscillator synchronizing system, the combination of a source of synchronizing signals which may be contaminated by spurious and undesired impulses, an oscillation generator having a temperature-responsive frequency determining element and arranged to provide an output wave of substantially the same frequency as said synchronizing signals in the absence of frequency-corrective energy applied thereto, a heat dissipative element adjacent said frequency determining element, means for substantially eliminating the deleterious effect of said spurious and undesired impulses while maintaining synchronism between said synchronizing signals and said output wave comprising, means for deriving a periodic wave dependent in waveform upon the relative phase relation of said synchronizing signals and said output wave, and means for applying only the alternating current components of said derived wave to said heat dissipative element, said frequency determining element having a temperature coefficient of such polarity that changes in the temperature of said heat dissipative element cause changes in the frequency of said oscillation generator in the proper direction substantially to maintain said output wave in phase with said synchronizing signals.

7. In an oscillator synchronizing system, the combination of a source of synchronizing signals which may be contaminated by spurious and undesired impulses, an oscillation generator having a temperature sensitive frequency-determining element, said generator being arranged to provide an output wave of substantially the same frequency as said synchronizing signals in the absence of frequency-corrective energy applied thereto, means for substantially eliminating the deleterious effect of said spurious and undesired impulses while maintaining synchronism between said synchronizing signals and said output wave comprising, means for comparing said output wave with said synchronizing signals and deriving therefrom a periodic wave dependent in waveform upon the relative phase relation of said synchronizing signals and said output wave, and means responsive to the alternating components of said derived wave for varying the temperature of said element as a function thereof, said element having a temperature coefficient of such polarity that changes in the temperature of said element will vary the frequency of said oscillation generator in the proper direction substantially to maintain said output wave in phase with said synchronizing signals.

8. In an oscillator synchronizing system, the combination of a source of synchronizing signals which may be contaminated by spurious and undesired impulses, an oscillation generator having first and second temperature-sensitive frequency-determining elements and arranged to provide an output wave of substantially the same frequency as said synchronizing signals, a heat dissipative element in contiguity with said first frequency-determining element, and means for substantially eliminating the deleterious effect of said spurious and undesired impulses while maintaining said output wave in synchronism with said signals comprising means for deriving a periodic wave dependent in waveform upon the relative phase relation of said output wave and said signals, means for applying only the alternating components of said periodic wave to said heat dissipative element, said first frequency-determining element having a temperature coefficient of such polarity that changes in the temperature of said heat dissipative element cause changes in the frequency of said oscillator in the proper direction substantially to maintain said output wave in phase with said signals, said second frequency-determining element having a temperature coefficient of opposite polarity to said first element to correct for ambient temperature changes.

ROBERT B. DOME.

References Cited in the file of this patent

UNITED STATES PATENTS

| Number | Name | Date |
|---|---|---|
| 2,209,507 | Campbell | July 30, 1940 |
| 2,233,165 | Goldman | Feb. 25, 1941 |
| 2,233,198 | Dome | Feb. 25, 1941 |
| 2,381,238 | Wendt | Aug. 7, 1945 |
| 2,460,112 | Wright et al. | Jan. 25, 1949 |
| 2,471,262 | Cousins | May 24, 1949 |
| 2,483,070 | Spindler | Sept. 27, 1949 |
| 2,521,058 | Goldberg | Sept. 5, 1950 |
| 2,539,218 | Worcester | Jan. 23, 1951 |